United States Patent Office 2,951,010
Patented Aug. 30, 1960

2,951,010

SUBSTITUTED CARBANILIDE COMPOSITIONS FOR TREATING COCCIDIOSIS

Robert C. O'Neill, New York, N.Y., and Arthur J. Basso, Rahway, N.J., assignors to Merck & Co., Inc., Rahway, N.J., a corporation of New Jersey No Drawing. Filed Sept. 26, 1955, Ser. No. 536,772

6 Claims. (Cl. 167—53.1)

This invention relates to novel substituted urea compounds and to processes for preparing these novel compounds.

It has been found that these substituted urea compounds possess marked and effective action in the control and treatment of the disease coccidiosis which infects poultry. The substituted urea compounds with which this invention is concerned may be represented by the following structural formula:

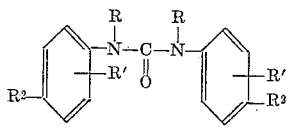

wherein R is methyl, ethyl or hydrogen and where at least one R is methyl or ethyl, R' is hydrogen or a lower alkyl group and $R^2$ is an electron withdrawing group.

The electron withdrawing groups which may be substituted in the 4 and 4'-positions in the above formula include nitro, cyano, carboxyl, carboalkoxy, acetyl, trimethyl ammonium, sulfonic acid, sulfonamide and carbamido groups. Such groups are alternatively referred to as meta directing (see Fieser and Fieser, "Organic Chemistry," 2nd edition, 1950, p. 595). Specific carbanilide compounds which may be N-alkylated include 4,4'-dinitrocarbanilide; 2-methyl-4,4'-dinitrocarbanilide and 4,4'-dicyanocarbanilide. The electron withdrawing groups need not be the same and compounds such as 4-nitro-4'-cyanocarbanilide, and 4-nitro-4'-acetocarbanilide may be employed. The 4,4'-dinitro group is preferred but other carbanilides having different electron withdrawing groups in the 4 and 4'-positions may be used.

The N-mono substituted urea compounds having one methyl or ethyl group attached to one nitrogen atom may be produced by reacting a compound of the formula—

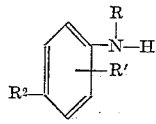

wherein R is methyl or ethyl, R' is hydrogen or a lower alkyl group and $R^2$ is an electron withdrawing group with a compound of the formula—

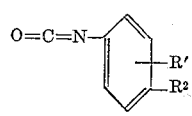

wherein R' and $R^2$ are as above.

This reaction results in the formation of a compound of the formula—

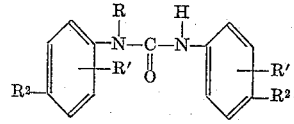

wherein R, R' and $R^2$ are as above.

In accordance with a specific method for carrying out the procedure for preparing the mono substituted urea compounds discussed above N-methyl-p-nitroaniline and p-nitrophenylisocyanate are heated together in a dry, inert solvent preferably an aromatic hydrocarbon, for one to twelve hours. The mixture is cooled whereupon N-methyl-4,4'-di-nitrocarbanilide separates from solution and is recovered by filtration.

The disubstituted compound can be prepared by reacting N-methyl-p-nitroaniline and N-methyl-N-(4-nitrophenyl)carbamyl chloride and recovering N,N-dimethyl-4,4'-dinitrocarbanilide.

The substituted urea compounds prepared in accordance with this invention are active against the widespread poultry disease commonly called coccidiosis which is caused by species of protozoan parasites of the genus Eimeria. In this regard, E. tenella is responsible for a severe and frequently fatal infection of the cecum of chickens. Furthermore, other serious infections are caused in fowl by other species of Eimeria and especially E. acervulina, E. necatrix, E. maxima and E. brunetti. If left untreated, such infections often cause extensive losses of fowl. The elimination or control of coccidiosis is, therefore, of the utmost importance for successful poultry raising.

According to a further embodiment of this invention, novel compositions useful in the treatment of coccidiosis are provided containing a substituted urea compound as an active ingredient. These compositions comprise a substituted urea complex intimately combined with an inert carrier. In this regard compositions which contain a compound of the formula—

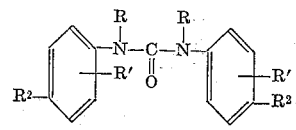

wherein R is methyl, ethyl or hydrogen and where at least one R is methyl or ethyl, R' is hydrogen or a lower alkyl group, and $R^2$ is an electron withdrawing group as the active ingredient have been found to be particularly useful against coccidiosis.

These compositions comprise at least one of the substituted urea compounds mentioned above combined with an inert carrier or diluent. Such compositions are conveniently produced by intimately dispersing the active ingredient throughout a carrier. The carrier or diluent may be either liquid or solid. Liquid dispersions can be prepared satisfactorily by using emulsifiers and surface active agents. Any solid can be used as a carrier which is inert toward the active compounds and which can be administered to animals with safety. Examples of suitable carriers are ground oyster shells, attapulgus clay, and edible vegetable materials such as commercial animal and poultry feeds, urea, corn meal, ground corn, citrus meal, fermentation residues and distiller's dried grains. The active ingredient is conveniently dispersed in a solid carrier by conventional methods such as stirring, tumbling, and grinding. In this manner, by selecting different carriers and by altering the ratio of carrier to active ingredient, compositions of varying concentration can be prepared. Compositions very suitable for addition to poultry feed may contain from 5% to about 40% of the new coccidiostat and preferably about 10 to 30%, absorbed on or mixed with a carrier.

Premixes of N,N'-dimethyl-4,4'-dinitrocarbanilide may be prepared as referred to above in a general manner. A satisfactory formulation is described in detail below—

| Ingredient: | Pounds |
|---|---|
| N,N'-dimethyl-4,4'-dinitrocarbanilide | 300 |
| Corn distiller's dried grains (through 30 mesh screen) | 175 |
| Wheat shorts (30–80 mesh) | 455 |
| Dried vitamin $B_{12}$ fermentation solubles (30–80 mesh) | 70 |
| Total | 1,000 |

The total amounts of wheat shorts and fermentation solids, and about 150 pounds of corn distiller's dried grains are mixed followed by the N,N'-dimethyl-4,4'-dinitrocarbanilide and the remainder of the corn distiller's dried grains. After mixing for about two hours the material is ready for packaging. Each pound of the mixture contains 0.30 pound of the coccidiostat, N,N'-dimethyl-4,4'-dinitrocarbanilide.

Products such as the above are suitable for incorporation into poultry feedstuffs in order to obtain the desired dosage level of active drug.

The amount of active ingredient required for effective prophylactic control of coccidiosis is very low. With regard to poultry good results have been obtained by the administration of a quantity of the active ingredient equal to about 0.005% to 0.1% of the food consumed. Optimum results are usually obtained by the daily administration of a quantity of active ingredient equal to about 0.01% to about 0.05% of the food consumed. Such relatively small amounts may be conveniently incorporated in the normal ration prior to feeding the poultry. The larger concentrations of up to about 0.1% of the active ingredients may be employed if an outbreak of the disease is encountered.

The coccidiostatic activity of compositions containing various substituted urea compounds was experimentally demonstrated according to the following test:

Four groups of ten two-week old chicks were fed a mash feed containing from 0.01% to 0.04% of the active ingredient uniformly dispersed therein. After existing on the diet for twenty-four hours, each chick was inoculated with 50,000 sporulated cocyst of E. tenella. In addition, four groups of ten chicks were also infected but fed a diet free of the active ingredient and used as positive controls. The experiment was terminated after administering the respective diets for seven days after inoculation and the following results were obtained: The cocyst count (number of parasites of E. tenella remaining was determined by sacrificing the birds and examining the infected organs microscopically.

TABLE I

Anticoccidial testing results

| Sample | Percent In Feed | Percent Mortality | Percent Wt. Gain | Oocysts, millions/chick |
|---|---|---|---|---|
| N-methyl-4,4'-dinitrocarbanilide | 0.01 | 10 | 62 | 22 |
|  | 0.02 | 0 | 73 | 15 |
|  | 0.04 | 0 | 84 | 0.6 |
| N,N'-dimethyl-4,4'-dinitrocarbanilide | 0.01 | 0 | 85 | 16 |
|  | 0.02 | 0 | 77 | <0.1 |
|  | 0.04 | 0 | 65 | <0.1 |
| N,N'-diethyl-4,4'-dinitrocarbanilide | 0.01 | 0 | 34 | 0.4 |
|  | 0.02 | 0 | 58 | <0.1 |
| Controls | None | 22.5 | 38 | 23 |

The following example is intended to be illustrative only and may be varied or modified without departing from the spirit and scope of this invention:

EXAMPLE 1

Preparation of N-methyl-4,4'-dinitrocarbanilide

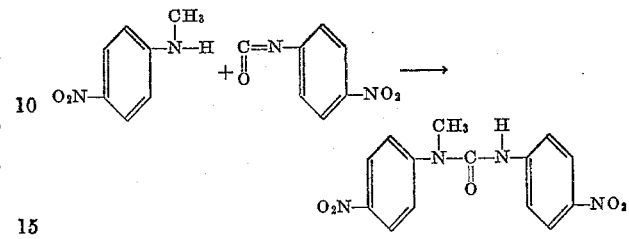

To one liter of a dry xylene slurry containing 45.6 grams (0.3 mol.) of N-methyl-p-nitroaniline was added 600 ml. of dry toluene containing 49 g. (0.3 mol.) of paranitrophenylisocyanate. The reaction mixture was stirred and heated at vigorous reflux temperature two and one-half hours, cooled and filtered. The crystalline filter cake was washed well with toluene, ether, hot ethanol and dried. The product, N-methyl-4,4'-dinitrocarbanilide, consisted of small, hard, greenish-yellow nuggets, melting point 203–205° C.

Analysis.—Calculated for $C_{14}H_{12}O_5N_4$: C, 53.2; H, 3.83; N, 17.7. Found: C, 52.96; H, 3.70; N, 17.82.

EXAMPLE 2

Preparation of N-ethyl-4,4'-dinitrocarbanilide 31.1 g. (0.188 mole) of N-ethyl-p-nitroaniline was added to a solution of 30.9 g. (0.188 mole) of p-nitrophenylisocyanate and 300 ml. of anhydrous xylene. The reaction mixture was stirred at vigorous reflux for five and one half hours, cooled to room temperature, and the product collected by filtration. The cake was washed with benzene, ether and dried to constant weight to yield N-ethyl-4,4'-dinitrocarbanilide having a melting point of 217–220° C., to a clear amber melt.

Analysis.—Calculated for $C_{15}H_{14}O_5N_4$: N, 16.97. Found: N, 16.92.

EXAMPLE 3

Preparation of N,N'-diethyl-4,4'-dinitrocarbanilide

N-ethyl-N-(4-nitrophenyl) carbamyl chloride, I, having a melting point of 118–119° C., was prepared by the action of phosgene on N-ethyl-p-nitroaniline in dry toluene containing triethylamine as the acid acceptor.

16.0 g. (0.07 mole) of I and 11.6 g. (0.07 mole) of N-ethyl-p-nitroaniline were dissolved in 50 ml. of warm anhydrous xylene containing 6 ml. of pyridine. The mixture was refluxed two and three-quarter hours, cooled to room temperature, and filtered. The cake of crude crystals was triturated with water, filtered. The second cake was washed well with 6 N hydrochloric acid and water, then recrystallized from ethanol with charcoal treatment. The stout pale yellow crystals of N,N'-diethyl-4,4'-dinitrocarbanilide thus obtained melted sharply at 151.5–152.5° C.

Any departure from the above description which conforms to the present invention is intended to be included within the scope of the claims.

What is claimed is:

1. A composition useful against coccidiosis which comprises an animal feedstuff and a compound represented by the formula—

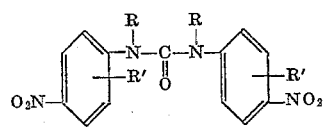

wherein R is selected from the group consisting of methyl, ethyl and hydrogen where at least one R group is the alkyl group and R' is selected from the group consisting of hydrogen and a lower alkyl group.

2. A composition useful against coccidiosis which comprises a compound of the formula

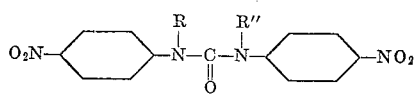

wherein R is a member selected from the group consisting from methyl and ethyl, and R" is a member selected from the group consisting of methyl, ethyl and hydrogen dispersed in an animal feedstuff.

3. A composition useful against coccidiosis which comprises N-methyl-4,4'-dinitrocarbanilide dispersed in an animal feedstuff.

4. A composition useful against coccidiosis which comprises N-ethyl-4,4'-dinitrocarbanilide dispersed in an animal feedstuff.

5. A composition useful against coccidiosis which comprises N,N'-dimethyl-4,4'-dinitrocarbanilide dispersed in an animal feedstuff.

6. A composition useful against coccidiosis which comprises N,N'-diethyl-4,4'-dinitrocarbanilide dispersed in an animal feedstuff.

References Cited in the file of this patent

UNITED STATES PATENTS

| 2,472,422 | Harwood | June 7, 1949 |
| 2,567,358 | Waletzky | Sept. 11, 1951 |
| 2,683,083 | Hill et al. | July 6, 1954 |

FOREIGN PATENTS

| 17,123 | Great Britain | July 25, 1913 |

OTHER REFERENCES

Schroeder et al.: Ind. and Eng. Chem., vol. 42, 1950, p. 545.

McVeigh et al.: J. Chem. Soc., 1945, pp. 621–2.

Chem. Abst., vol. 27, 1933, p. 904 (abst. of Masaki).

Chem. Abst., vol. 29, 1935, pp. 4177–78 (abst. of Moisak).

Chem. Abst., vol. 29, 1935, p. 7298 (abst. of Harrison).